Feb. 10, 1931.  R. H. CHILTON  1,792,070

RUBBER SPRING SHACKLE

Filed June 7, 1926

Inventor
Ralph H. Chilton
By Spencer Sewall & Hardman
his Attorneys

Patented Feb. 10, 1931

1,792,070

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

RUBBER SPRING SHACKLE

Application filed June 7, 1926. Serial No. 114,123.

This invention relates to non-metallic joints and has particular reference to the shackles interposed between the supporting springs and the chassis frame of automotive vehicles.

An object of this invention is to provide an improved form of non-metallic shackle which gives long life to the non-metallic elastic material due to the greatly increased bearing area thereupon and thereby also permitting a more flexible and efficient elastic material to be used therein.

Another object is to provide a shackle having positively limited relative lateral motion of the spring and frame and hence provide a positive limit to the side sway of the chassis frame.

Another object is to provide a non-metallic pivot shackle which can transmit the tractive force between the spring and chassis frame in either forward or rearward direction and hence can transmit the driving thrust of the Hotchkiss type drive or the reverse thrust which occurs during application of the brakes or when backing the car. A feature of this pivot shackle when used on the front end of the rear automobile springs is the positively limited rearward movement of the spring end relative to the chassis frame. Hence the relatively large braking forces may be transmitted without excessively stressing the main body of the elastic material.

Further objects and advantages of the present invention will be apparent from the following description, reference being had to the accompanying drawings, wherein a preferred form of embodiment of the invention is clearly shown.

In the drawings.

Similar reference characters refer to similar parts throughout the several views.

Figure 1:
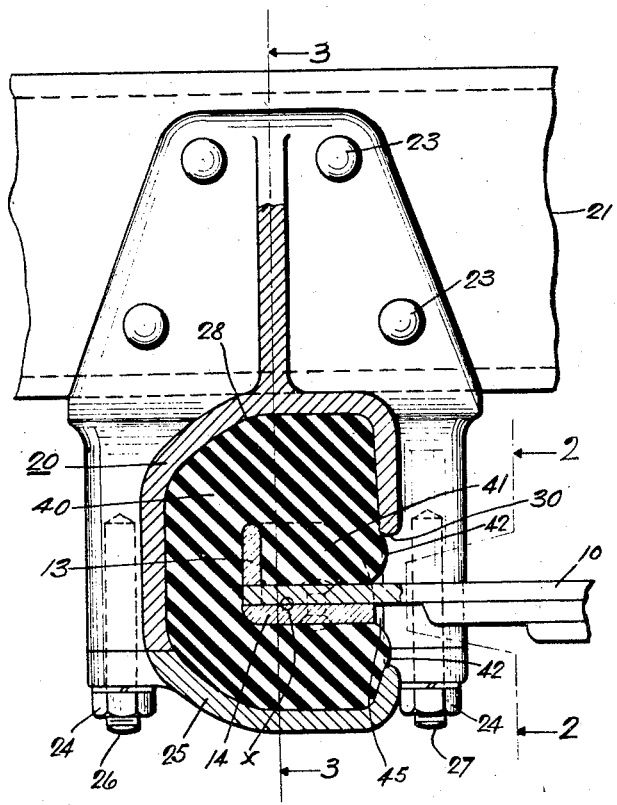
Fig. 1 illustrates a shackle made according to this invention connecting the front end of a rear spring of an automotive vehicle to the chassis frame. The section is taken on line 1—1 of Fig. 3.

Numeral 10 designates the long leaf of one of the leaf springs which support the chassis frame upon the rear axle. A bearing member 12 is rigidly fixed to the end of leaf 10. This member 12 is substantially angular in form, having a vertical leg 13 and a horizontal leg 14 extending transversely to the leaf 10. This member 12 may be fixed to leaf 10 in a variety of ways, one suitable method being clearly illustrated. The end of leaf 10 is cut away to form a tongue 15 and a shoulder 16 on each side thereof. The leg 13 is slotted or recessed to snugly receive the tongue 15 while the two shoulders 16 bear against the inner surface of leg 13. The leg 14 is fixed to the leaf 10 by the rivets 17, which preferably are spaced some distance from the rear edge 18 of the leg 14 in order not to pierce the leaf 10 at the point where the bending moment therein is great. Preferably end walls 19 are provided between the legs 13 and 14. These walls 19 may be made by bending up the metal from either leg 13 or leg 14 and welding the edge lying adjacent the other leg thereto to form a very rigid structure.

A housing member 20 is rigidly fixed to the side rail 21 of the chassis frame by the shoulder 22 and the rivets 23. Housing member 20 has a complementary cap 25 which is clamped in place by the four studs or bolts 26 and 27 with suitable lock washers and nuts 24.

The bearing member 12 is inserted within suitable recesses provided therefor in an elastic rubber block 40 whose outside dimensions are substantially those of the recess 28 of housing 20. The elastic block 40 has a portion 41 which fits snugly down between the end walls 19 of member 12 while the remaining portions of block 40 extend laterally slightly beyond the walls 19. The block 40, having been assembled upon the member 12 fixed to the end of the spring 10, it is set up snugly within recess 28 of housing 20 and the cap 25 clamped in place by tightening nuts 24, thus putting the elastic rubber under compression and causing it to bulge out slightly as shown at 42 at the opening 30 through which the leaf 10 extends into the housing 20. The end walls 19 of bearing member 12 clear the lateral walls 29 of housing 20 by only a relatively small clearance 43 but which is sufficient to normally prevent contact between the member 12 and housing 20 during pivotal movement of the spring. The opening 30 provides sufficient clearance for all movements of the spring leaf 10 without contacting with the metal housing 20. The elastic rubber block 40 is of such dimensions that when the cap 25 is set up tight the rubber is forced into tight contact with the internal walls of housing 20 and the surfaces of bearing member 12, however clearance spaces 43 are preferably too narrow to permit the flow of rubber therein to any substantial extent.

The relatively narrow clearance space 45 between the rear edge 18 of leg 14 and the rear wall of recess 28 on the two sides of opening 30 (see Fig. 1) may or may not (as desired) be sufficiently small to prevent rubber from flowing therein and completely filling the same.

In operation, the bearing member 12 pivots upon the elastic rubber block 40 by the internal distortion of the rubber. During all ordinary pivotal movements the member 12 remains isolated from housing 20 since it is kept centered by the portion 41 of block 40 as well as by the non-slipping bond between the rubber and member 12. However when there is a great side thrust on the chassis frame the end walls 19 of member 12 will abut the side walls of housing 20 and thus give a positive limit to the amount of side sway possible in any event. The amount of this clearance 43 is determined by the amount of cushioned lateral movement desired in any given chassis design.

Figure 2:
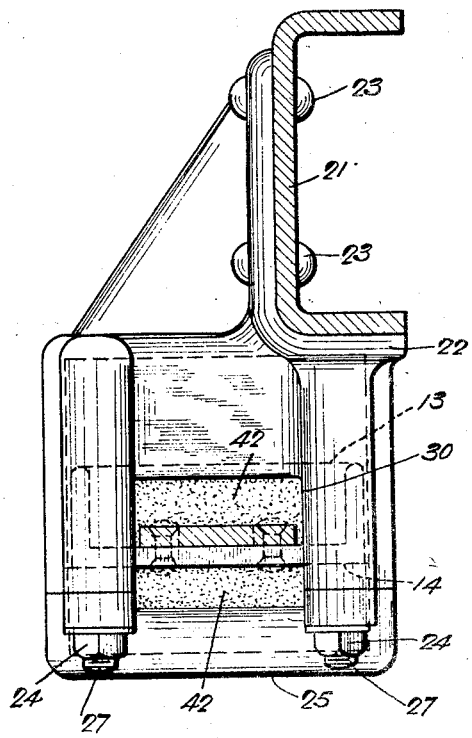
Fig. 2 is an end view of Fig. 1, the section through the spring being on line 2—2 of Fig. 1.
Figure 3:
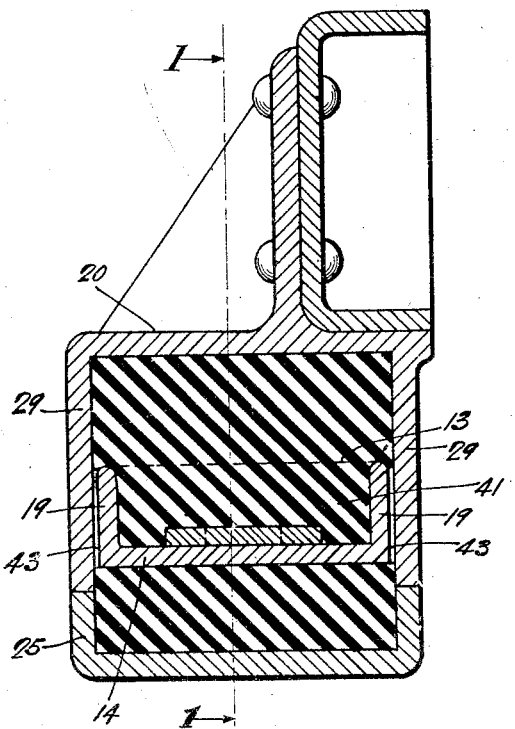
Fig. 3 is a section on line 3—3 of Fig. 1.
Figure 4:
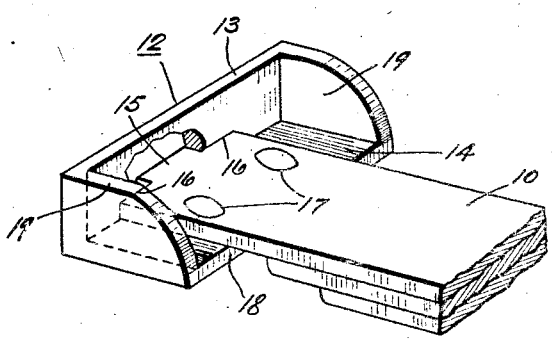
Fig. 4 is a perspective view of the bearing member secured to the end of the spring, part being broken away to more clearly show the attachment of the bearing member to the spring.

Tractive force forward is transmitted from leaf 10 to member 12 by the shoulders 16 bearing upon the leg 13 and by the rivets 17, and thence through the block 40 over the vertical area of the leg 13 to the housing 20 fixed to the frame. Rearward tractive force is transmitted first by the compression of the rubber portion 41 between leg 13 and the rear wall of housing 20 (see Fig. 2), and if sufficiently large for the closing of clearance 45, by the abutment of the rear edge 18 of leg 14 with the housing wall. This positive limit for the relative rearward movement of member 12 gives a better action for braking the vehicle and prevents excessive bulging of rubber through opening 30 at 42.

The leg 14 gives a large horizontal bearing area upon the elastic rubber block 40. By thus decreasing the load per unit area upon the rubber, a softer more flexible rubber may be used and a longer life thereof obtained. The bulges 42 of the soft rubber prevent mud or foreign matter entering at opening 30 and causing rapid deterioration of the rubber.

Preferably the outer edges of both legs 13 and 14 are made equidistant from the axis of pivotal movement which is indicated at X in Fig. 1. Also the periphery of end walls 19 are preferably rounded with the axis X as a center. This equalizes the distortion of the rubber block in various portions thereof and limits the maximum distortion required for a given angular movement of member 12.

While the form of embodiment of the present invention as herein disclosed, constitutes a preferred form, it is to be understood that other forms might be adopted, all coming within the scope of the claims which follow.

What is claimed is as follows:

1. In combination with a supporting leaf spring and frame of a vehicle, a pivot shackle interconnecting said frame and one end of said spring and transmitting tractive forces in both forward and rearward directions therebetween, said shackle comprising: a transverse bearing member of generally right angle transverse section fixed to the end of said spring and projecting laterally on each side of said spring, one leg of said bearing member lying flat against the end portion of said spring while the other leg extends perpendicular thereto and in abutting relation with an end surface of said spring, a rigid housing fixed to said frame and enclosing said spring end and bearing member but leaving a chamber thereabout, and elastic rubber substantially completely filling said chamber so as to prevent any material to and fro movement of the spring end within said housing but to permit pivotal movement of the spring end and its attached bearing member therein by internal torsional twist within the rubber.

2. In combination with a supporting leaf spring and frame of a vehicle, a pivot shackle interconnecting said frame and one end of said spring and transmitting tractive forces in both forward and rearward directions therebetween, said shackle comprising: a transverse bearing member of generally angular transverse section fixed to the end of said spring and projecting laterally on each side of said spring, said bearing member having vertically and horizontally disposed legs whose outer edges are substantially equidistant from the pivot axis of said bearing member, a rigid housing fixed to said frame and enclosing said spring and end bearing member but spaced therefrom, and elastic rubber interposed between said housing and bearing member and so filling the space therebetween as to substantially prevent to and fro movement of the spring end but to permit pivotal movement of the spring end by internal torsional twist within said rubber.

3. In a vehicle having a chassis frame and a supporting leaf spring, a pivot shackle connecting and transmitting tractive forces in both forward and rearward directions between the spring end and frame comprising: a transverse bearing member rigid with the spring end and extending materially beyond the side edges of the spring, an elastic rubber block surrounding said bearing member, a housing supported by the frame and enclosing said rubber block under compression, said bearing member having its ends normally spaced a relatively short distance from the rear walls of said housing and adapted to abut same upon a small relative rearward motion of the spring whereby to positively transmit large rearward forces.

4. A pivot joint for connecting and transmitting tractive forces in both forward and rearward directions between two relatively movable parts comprising: a bearing member rigid with one of said parts, a housing supported by the second of said parts about said bearing member, elastic non-metallic material normally isolating said bearing member from said housing and having a substantially non-slipping surface grip upon said bearing member and housing whereby pivotal movement between said parts is taken by internal torsional twist within said elastic material, said bearing member having relatively small clearance with said housing in one direction of longitudinal thrust between said parts whereby relative longitudinal movement in said direction is positively limited after a small relative movement by said bearing member abutting said housing.

5. In a vehicle having a frame and supporting leaf spring, a pivot joint connecting and transmitting both forward and rearward forces between said spring and frame comprising: a transverse bearing member rigid with the spring end, a housing supported by the frame about said member, elastic non-metallic material normally isolating said bearing member from said housing, said housing having an opening for providing clearance with said spring, said opening being of materially less lateral width than said bearing member, said bearing member having substantially vertical and horizontal legs and having said horizontal leg thereof normally spaced a relatively small distance from the housing wall on the side toward said clearance opening and adapted to abut said wall to positively limit relative longitudinal movement in that direction.

6. In an automotive vehicle having a chassis frame and a supporting leaf spring, a pivot joint connecting the spring end and frame and adapted to transmit both forward and rearward tractive forces therebetween, said joint comprising: a transverse bearing member rigid with the spring end and projecting laterally on both sides of said spring end, a housing fixed to said frame and enclosing said bearing member, resilient non-metallic material within the unoccupied space within said housing and normally isolating said bearing member therein, said housing having an opening for providing clearance with said spring during pivotal movement thereof, said opening being of materially less lateral width than the length of said transverse bearing member, said bearing member being normally spaced a relatively small distance from the housing wall having said opening and adapted to abut said wall adjacent said opening whereby to directly transmit large tractive forces in that direction.

In testimony whereof I hereto affix my signature.

RALPH H. CHILTON.